2,870,684

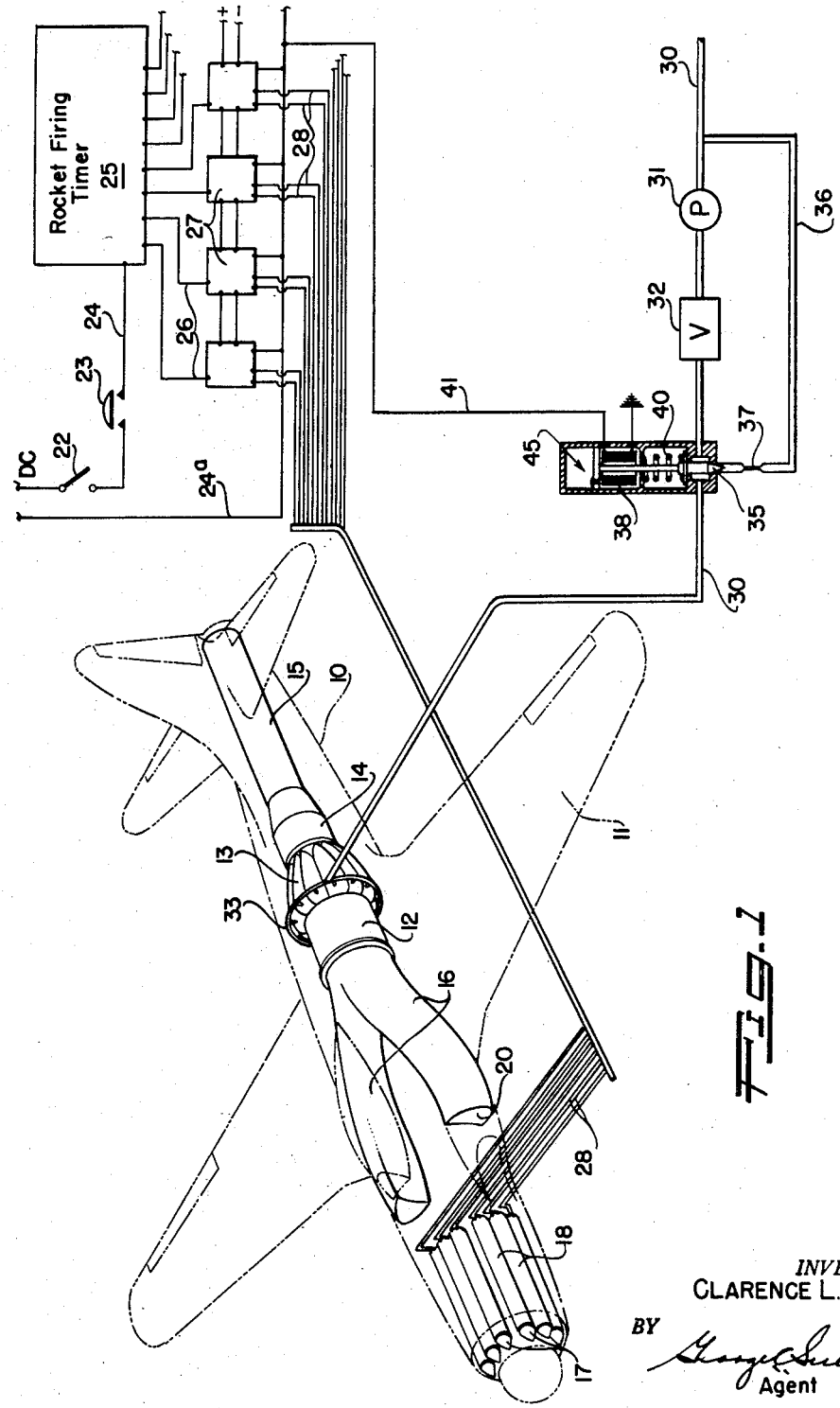

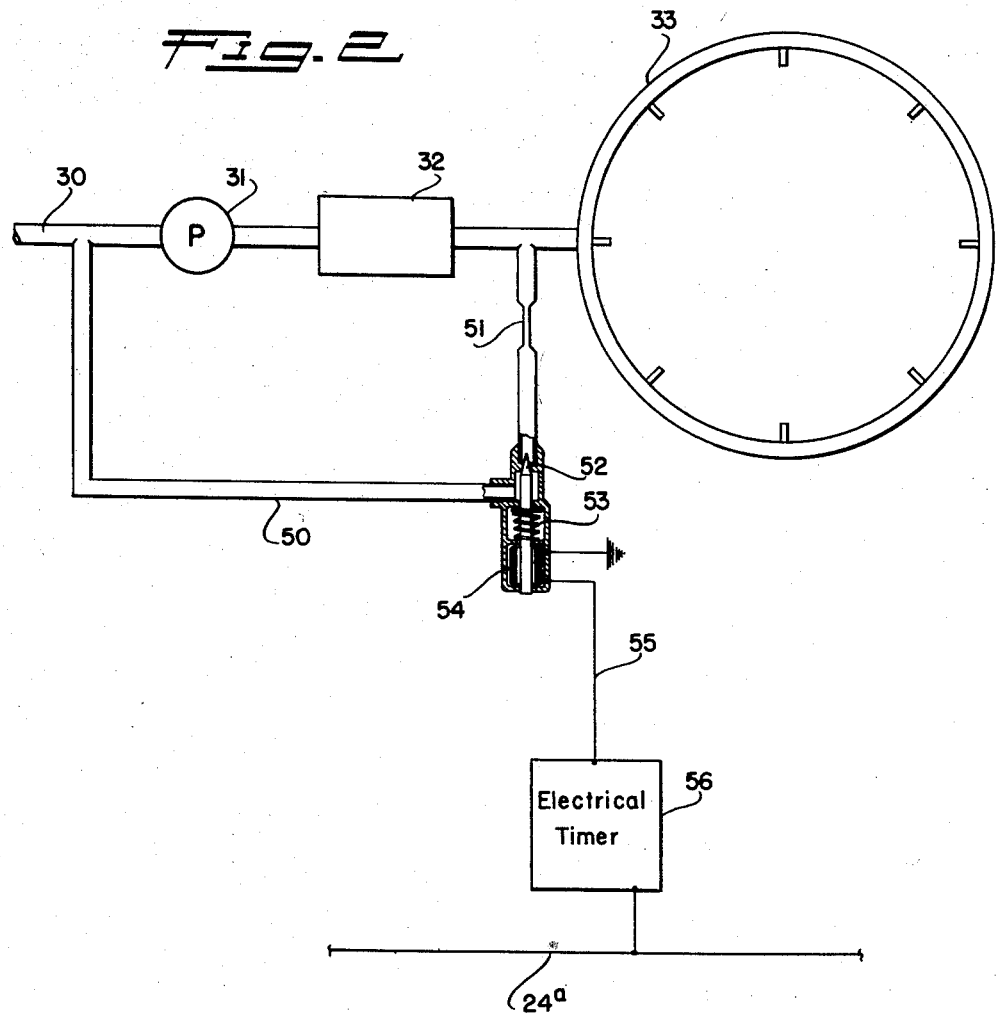

TURBINE ENGINE BLOW-OUT PREVENTER

Clarence L. Johnson, Encino, Calif., assignor to Lockheed Aircraft Corporation, Burbank, Calif.

Application December 28, 1953, Serial No. 400,463

10 Claims. (Cl. 89—133)

This invention relates to the control of turbine engines of high performance military aircraft, and the like, and relates more particularly to systems for preventing the interruption of operation, or the "blowing out," of such engines as a result of the induction by the engines of high temperature gases and/or air released upon firing large caliber armament of such aircraft.

It has been found that the firing of armament of certain high performance aircraft has the effect of disrupting or stopping the operation of the turbine engines of the airplane. This phenomenon occurs primarily at high altitude and is caused by the immense amount of heat released in a very short time by the firing of the armament, which heat, in turn, increases the temperature of the low density air being inducted into the engine to the extent that the carefully metered fuel-air ratio is thrown out of balance. The fuel-air ratio is increased far beyond the maximum rich limit capable of supporting combustion with the result that the engine combustion is terminated. The change or increase in inducted air temperature is so abrupt and so rapid that the fuel control means incorporated in the engine installation to compensate for changes in the air mass flow during normal flight maneuvers cannot reduce the fuel flow rapidly enough to properly match the fuel flow with the reduced air flow and the rich fuel limit is exceeded, resulting in a "rich blow-out" of the engine.

It is an object of the present invention to provide a simple, dependable means or system for automatically reducing the fuel flow of a turbine engine at approximately the same rate as any substantial reduction in the inducted air mass flow to thereby maintain a fuel-air ratio which assures continued stable combustion. The system of the invention, by reducing the fuel flow at approximately the same rate as the air mass flow reduction, preserves a fuel-air ratio condition that maintains combustion in the engine even when the firing of rockets or other missiles at high altitude rapidly and substantially increases the temperature of the inducted low density air. The action of my system produces no adverse effect upon engine operation other than a very short period of engine thrust reduction.

Another object of the invention is to provide a system of the character mentioned that is entirely automatic and that is coordinated with the armament firing system. It has been proposed to manually retard the engine throttle an instant before the firing of the armament and to allow the throttle to remain in the retarded position during the armament firing cycle and to then manually restore the throttle to its original or normal position. Such manual operations require close pilot attention and coordination which are difficult during actual combat and such manual control or operation of the throttle is likely to result in an excessive loss of propulsive thrust at a time when the highest possible engine performance is required. The system of the present invention is fully automatic and retains the fuel-air ratio within the proper limits during the entire armament firing cycle and restores the fuel-air ratio to the proper high performance condition at the earliest possible moment following the firing cycle.

It is a further object of the invention to provide a turbine engine blow-out preventing system of this kind that is simple and easy to embody in the engine installation or unit and that requires a minimum of alteration in the general fuel system, etc. of the engine.

Other objectives and features of the invention will become apparent from the following detailed description of typical forms and applications thereof illustrated in the accompanying drawings, wherein:

Figure 1 is a schematic or diagrammatic view of one typical form of the invention as incorporated in a fighter aircraft; and Figure 2 is a fragmentary schematic diagram of another form and application of the invention.

The device or system of the invention is, of course, adapted for use in conjuction with aircraft engines of different makes and types and in connection with engines as employed in aircraft and vehicles of widely different classes and types. Furthermore the invention is suitable for use in aircraft armed with armament of different characters. It is useful in practically any situation where the temperature of the air inducted into a turbine engine is liable to be rapidly and appreciably increased as a result of the firing or discharge of armament, or the like. In the drawings I have shown the invention incorporated in an airplane equipped with rocket tubes so arranged or located that the firing of their respective rockets may result in suddenly and materially increasing the temperature of the air being inducted into a turbo engine. It is to be understood that this is merely a typical use or application of the invention and is not to be construed as limiting or restricting either the scope or field of usefulness of the invention.

The airplane, illustrated in a general way, includes a fuselage 10 and wings 11. The propulsive engine of the airplane includes a compressor 12, combustor 13, a turbine means 14, and a tail pipe 15 terminating in a nozzle, this arrangement being typical of turbojet powerplants. Air is supplied to the engine by ducts 16 having air inlets 20 opening forwardly adjacent the roots of the wings 11, the ducts leading aft from these inlets to the compressor 12. The airplane is armed with a row or series of rockets 17 arranged in tubes 18 on the fueslage 10 ahead of the engine air inlets 20. With such an arrangement the firing of the rockets 17, either individually or in salvos, results in a rapid and material increase in the temperature of the air received in or inducted by the engine air inlets 20. While the present invention is not primarily concerned with the system for controlling and firing the armament, I have illustrated, diagrammatically, a more or less typical rocket firing system. This includes an arming switch 22 and a firing switch 23 connected in a power lead 24 which extends to a timer or intervalometer 25. The intervalometer 25 is operable to either individually or simultaneously energize circuits 26 extending to the rocket firing relays 27. Lines or circuits 28, controlled by the relays 27, extend to the rocket tubes 18 so that the rockets 17 are fired or discharged upon operation of their related relays 27.

The fuel system of the turbine engine includes a fuel supply line 30, a fuel pump 31 in said line, and a main fuel control 32 in said line at the downstream side of the pump. The main fuel control 32 may include the various valves, control elements, etc. for throttling and controlling the engine and for normally maintaining the correct fuel-air ratio in the combustor 13. The present invention is not primarily concerned with the details of this main control 32 and such details are omitted from this disclosure. The fuel line 30 extends from the main fuel control 32 to the fuel manifold or ring 33 of the combustor 13 from which the fuel is introduced or discharged into the combustion chamber or chambers.

The invention provides valve means in the fuel system of the engine related or coordinated with the armament firing system to automatically reduce the fuel flow to the engine upon the firing of one or more rockets 17. This valve means may be in the nature of a two-position solenoid operated valve 35 interposed in the fuel line 30 between the main control 32 and the fuel ring 33 of the engine. The valve 35 is preferably a two-position valve having a first position where it allows full fuel flow to the engine and a second or open position where it puts a bypass 36 in communication with the line 30 so as to bypass a portion of the fuel and thus reduce the fuel flow to the engine. The bypass 36 extends from the valve 35 to the inlet side of the pump 31 or to the line 30 at the inlet side of the pump. It is desirable to provide a restrictor 37 in the bypass line 36 so that the bypass constitutes a fixed or known fuel bleed "tailored" or correctly related to the particular engine or particular make and type of engine with which the system is associated. The valve or valve means further includes a solenoid winding 38 which, when energized, opens the valve 35 and thus opens the bypass 36 to the fuel line 30. A spring 40 is provided for returning the valve 35 to the closed position and for normally holding the valve in this closed position.

In accordance with the invention the normally closed by-pass valve 35 is opened coincident with the discharge or firing of the rockets 17. An electrical energizing wire or lead 41 extends from one terminal of the valve operating solenoid 38 to the armament firing or control system while the other terminal of the winding may be grounded, as shown. The energizing lead 41 may be connected with a selected or appropriate wire of the armament firing system, for example it may be connected to the power line 24 to be energized when both the arming switch 32 and the firing switch 23 are closed. However, it is, in most instances, preferred to connect the valve actuating line 41 with the common return wire 24a of the firing circuit 24–24a so that the valve 35 is actuated or opened simultaneously with the energization or actuation of a firing relay 27, or several of the relays. Thus the valve 35 is opened to reduce the flow of fuel to the engine simultaneously with the firing or discharge of the rocket or rockets 17.

It will usually be desirable to delay the return of the valve 35 to its closed position, where, full or normal fuel flow to the engine is resumed, for a short duration or period following the firing of a rocket or rocket salvo because the temperature of the air inducted at the engine inlets 20 remains above the normal temperature for a short period following actual firing of the rocket or rockets. As diagrammatically illustrated in Figure 1, this may be accomplished by providing a dash pot means 45 at the bypass valve assembly to retard or delay the closing of the spring loaded valve 35 for a short time, say 0.50 sec. following de-energization of the solenoid winding 38.

Figure 2 illustrates schematically another form or embodiment of the invention. In this arrangement the fuel system of the engine includes the fuel line 30, the pump 31, the main fuel control 32 and the fuel manifold or ring 33, all as already described. A bypass pipe 50 has one end connected with the fuel line 30 at the inlet side of the pump 31 and its other end is connected with the fuel line 30 between the main control 32 and the fuel ring 33. The bypass 50 may include a restrictor 51 similar to the restrictor 37 above described, and for the same purpose. The invention provides a valve 52 in the bypass 50. The valve 52 is a two-position solenoid valve having a spring 53 normally urging it to the closed position to prevent fuel flow through the bypass and a solenoid winding 54 operable when energized to move the valve to the open position to allow fuel flow through the bypass and thus reduce fuel flow to the engine. The energizing lead or wire 55 of the solenoid winding 54 is connected with the common return power line 24a of the armament firing circuit. This embodiment of the invention includes an electric or electronic delay device or timer 56 connected with the wire or line 55 to delay the reclosing of the valve 52 for a short period following the actual firing of the rocket, or the like. The timer 56 may be a suitable time delay relay, for example an electro-thermal time delay relay or any other conventional time delay relay that will serve to maintain the solenoid 54 energized for from, say, 0.25 to 1.0 sec. after firing of the rocket or rockets or after de-energization of the relays 27.

It is believed that the features and operation of the systems of the invention will be readily understood from the foregoing detailed description. So long as the armament firing system remains inactive, the valve 35 or the valve 52, as the case may be, remains in the closed position and the system of the invention has no effect whatsoever upon the normal control and functioning of the engine. However, immediately upon actuation of the armament firing system to energize one or more of the rocket firing relays 27, the lead 41 or 55 is energized to energize the solenoid coil 38 or 54. This opens the valve 35 or 52 and allows a substantial portion of the fuel to bleed or bypass back around the main control 32 and pump 31 thus "leaning out" the fuel-air mixture. This prevents the development of an excessively rich fuel-air mixture in the combustor 13 as a result of the sudden and appreciable increase in the temperature of the air inducted at the engine inlets 20 and thereby prevents the engine from "blowing out" or losing combustion. The reduced fuel delivery to the engine maintains combustion even though the thrust output is momentarily reduced. Upon de-energization of the solenoid line 41 or 55 occurring at the end of the rocket firing sequence or salvo the dashpot means or the timer 56 delays reclosing of the valve for a short time sufficient to allow the hot gases and air produced during the rocket firing to clear the engine inlets 20. At the expiration of this short period the valve 35 or 52 closes so that the normal or correct fuel flow to the engine is reestablished and the correct or desired fuel-air ratio is reestablished in the combustor to again bring the engine to the high performance or high output condition.

Having described only typical forms of the invention I do not wish to be limited to the specific details herein set forth, but wish to reserve to myself any variations or modifications that may appear to those skilled in the art and fall within the scope of the following claims.

I claim:

1. In combination with an engine having a fuel pressure supply; an armament firing system; a pipe for bleeding fuel from the fuel pressure supply, a valve closing said pipe and operable when opened to allow the bleeding of fuel from said fuel supply to reduce fuel flow to the engine, and means uninfluenced by engine operating conditions and energized by the firing system for opening the valve.

2. In an airplane having a propulsive engine and electrically fired armament the combination of; an electric circuit system for firing the armament, a fuel supply system for the engine including a fuel pressure supply line for conducting fuel to the engine, and means operable independently of engine conditions for reducing the fuel flow to the engine during firing of the armament comprising a bleed pipe connected with said line, a normally closed valve for preventing fuel flow through the bleed pipe, electrical means for opening the valve, and a connection between said circuit system and the last named means whereby the valve is opened upon energization of the circuit system.

3. In an airplane having a propulsive engine and electrically fired armament the combination of; an electric circuit system for firing the armament, a fuel supply system for the engine including a fuel line for conducting fuel to the engine and a pump in the line for pumping the fuel, and means unaffected by engine operating conditions for reducing the fuel flow to the engine during firing of the armament comprising a bypass having one end connected with said line downstream from the pump and one end connected with said line upstream from the pump, a normally closed electrically operable valve for said bypass, and a connection between said circuit system and the valve for energizing and opening the valve when the circuit system is energized.

4. In an airplane having a propulsive engine and electrically fired armament the combination of; an electric circuit system for firing the armament, a fuel supply system for the engine including a fuel pressure supply line for conducting fuel to the engine a main control valve in said line normally maintaining the correct fuel-air ratio in the engine, said main valve serving to compensate for changes in the air mass flow in the engine during normal operations, and means unaffected by engine operating conditions for reducing the fuel flow to the engine during firing of the armament comprising a bleed pipe connected with said line downstream from said main valve upstream from the engine, a flow restrictor in the bleed pipe, a normally closed electrically operable valve for said bypass, and a connection between said circuit system and the valve for energizing and opening the valve when the circuit system is energized.

5. In an airplane having a propulsive engine and armament adapted to be electrically fired the combination of; a firing circuit for the armament including manually operable switch means for effecting firing of the armament, a fuel pressure supply line for conducting fuel to the engine, and means unresponsive to engine operating conditions for leaning down the fuel being delivered to the engine during firing of the armament comprising a fuel bleed pipe connected with said line, a solenoid valve closing said pipe, and an electrical connection between said firing circuit and the valve for energizing and opening the valve simultaneously with the energization of said firing circuit.

6. In an airplane having a propulsive engine and armament adapted to be electrically fired the combination of; a firing circuit for the armament including manually operable switch means for effecting firing of the armament, a fuel pressure supply line for conducting fuel to the engine, and means for leaning down the fuel being delivered to the engine during firing of the armament comprising a fuel bleed pipe connected with said line, a solenoid valve closing the bleed pipe, an electrical connection between the firing circuit and the valve for energizing and opening the valve when the firing circuit is energized, and time delay means for delaying reclosing of the valve when the firing circuit is de-energized by opening said switch means.

7. In an airplane having a propulsive engine and armament adapted to be electrically fired the combination of; a firing circuit for the armament including manually operable switch means for effecting firing of the armament, a fuel line for conducting fuel to the engine, a pump in said line for pumping the fuel, and means unaffected by engine operation for leaning down the fuel being delivered to the engine during firing of the armament comprising a bypass associated with said line for bypassing fuel around the pump, a valve for the bypass, spring means closing the valve, a solenoid coil for opening the valve, an electrical connection between the firing circuit and the solenoid coil whereby the coil is energized to open the valve when the firing circuit is energized, and time delay means for delaying reclosing of the valve by the spring means when the firing circuit is de-energized.

8. In an airplane having a propulsive engine and armament adapted to be electrically fired the combination of; a firing circuit for the armament including manually operable switch means for effecting firing of the armament, a fuel line for conducting fuel to the engine, a pump in said line for pumping the fuel, and means for leaning down the fuel being delivered to the engine during firing of the armament comprising a bypass associated with said line for bypassing fuel around the pump, a valve for the bypass, spring means closing the valve, a solenoid coil for opening the valve, an electrical connection between the firing circuit and the solenoid coil whereby the coil is energized to open the valve when the firing circuit is energized, and time delay dash pot means for delaying reclosing of the valve by the spring means when the firing circuit is de-energized.

9. In an airplane having a propulsive engine the combination of; armament adapted to be electrically fired, a firing circuit for the armament including manually operable switch means for effecting firing of the armament, a fuel pressure supply line for conducting fuel to the engine, and means operable independently of engine operating conditions for leaning down the fuel being delivered to the engine during firing of the armament comprising a fuel bleed pipe connected with said fuel supply line, a valve for the bleed pipe, spring means closing the valve, a solenoid coil for opening the valve, an electrical connection between the firing circuit and the solenoid coil whereby the coil is energized to open the valve when the firing circuit is energized, and time delay electrical timer means for delaying reclosing of the valve by the spring means when the firing circuit is de-energized.

10. In an airplane having a propulsive engine and armament adapted to be electrically fired the combination of; a firing circuit for the armament including manually operable switch means for effecting firing of the armament, a fuel line for conducting fuel to the engine, a pump in said line for pumping the fuel, and means operable independently of engine operating conditions for leaning down the fuel being delivered to the engine during firing of the armament comprising a bypass associated with said line for bypassing fuel around the pump, a valve for the bypass, spring means closing the valve, a solenoid coil for opening the valve, an electrical connection between the firing circuit and the solenoid coil whereby the coil is energized to open the valve when the firing circuit is energized, restrictor means for the bypass, and electrical timer means for delaying reclosing of the valve by the spring means when the firing circuit is deenergized.

References Cited in the file of this patent

UNITED STATES PATENTS

| | | |
|---|---|---|
| 2,529,508 | MacDonald | Nov. 14, 1950 |
| 2,551,229 | Alford et al. | May 1, 1951 |
| 2,557,526 | Bobier et al. | June 19, 1951 |
| 2,610,466 | Ballantyne et al. | Sept. 16, 1952 |
| 2,695,498 | Szydlowski | Nov. 30, 1954 |